United States Patent Office 3,826,783
Patented July 30, 1974

3,826,783
POLYQUINAZOLINES AND THEIR METHOD
OF MANUFACTURE
Bertrand M. Bloch, Paris, France, assignor to Office National d'Etudes et de Recherches Aerospatiales
No Drawing. Filed Nov. 19, 1970, Ser. No. 91,161
Claims priority, application France, Nov. 21, 1969, 6940059
Int. Cl. C08g 33/02
U.S. Cl. 260—47 CZ          23 Claims

ABSTRACT OF THE DISCLOSURE

The polyquinazolines contain in their chains quinazoline nuclei of the formula:

in which is a nucleus. $R_1$ is hydrogen or one of several lower alkyl substituents, lower alkoxyl or halogen at one or several of the free positions on the ring. These quinazoline nuclei are linked, either at their 2-positions through a direct linkage or an arylene group and at their 4-positions through an arylene, alkylene or alkylarylene group; or at their 2-positions through an arylene group and at one of their 5-, 6-, 7- and 8-positions, through a direct linkage or a short chain or heteratomic bivalent radical, such as —$CH_2$—, —CO—, —O—, —$SO_2$—, —S—; the quinazoline nuclei of the polyquinazolines thus obtained bearing an aliphatic or aromatic radical P, at their 4-positions, or at their 4-positions through a direct linkage or through an arylene, alkylene or aralkylene group and at one of their 5-, 6-, 7-, 8-positions, directly or through a short chain or heteratomic bivalent radical, such as —$CH_2$—, —CO—, —O—, —$SO_2$— or —S—; the quinazoline nuclei of the polyquinazolines then obtained bearing an aromatic radical Q at their 2-positions.

---

The invention relates to thermostable polymers and their methods of preparation.

It is known that industry, especially the electrical and aeronautical industries, require more and more polymers stable at high temperature. There has already, in response to this demand, been manufactured a certain number of heterocyclic polymers which show themselves to be thermostable in an inert atmosphere. They are however in general much less stable in corrosive or oxidizing atmospheres. In addition, they are costly, even if this were not only due to the cost of the raw materials which are generally used for their manufacture.

It is an object of the invention therefore to overcome these drawbacks, especially to provide heterocyclic polymers stable not only in an inert atmosphere, but also in an oxidizing atmosphere, raw materials and inexpensive methods of manufacture of these heterocyclic polymers.

The heterocyclic polymers according to the invention, hereinbelow called "polyquinazolines", are characterized by the fact that they contain in their chains quinazoline nuclei of the formula:

in which is a phenylene group where $R_1$ is hydrogen or represents one or several lower alkyl, lower alkoxyl or halogen substituents in one or several of the free positions of the ring, these quinazoline nuclei being linked between them, or at their 2-positions through a direct linkage or an arylene group and at their 4-positions through a direct linkage or an arylene, alkylene or alkylarylene group;

or at their 2-positions through an arylene group and at one of their 5-, 6-, 7- and 8-positions directly or through a short chain or heteroatomic bivalent radical, such as —$CH_2$—, —CO—, —O—, —$SO_2$— or —S—; the quinazoline nuclei of the polyquinazolines thus obtained bearing an aliphatic or aromatic radical (R) at their 4-positions, or at their 4-positions through a direct linkage or an arylene, alkylene or aralkylene group and at one of their 5-, 6-, 7-, or 8-positions, directly or through a short chain or heteroatomic bivalent radical, such as

—$CH_2$—,

—CO—, —O—, —$SO_2$— or —S—, the quinazoline nuclei of the polyquinazolines then obtained bearing an aromatic radical (Q) at their 2-positions.

It is understood that, in the preceding description as in that which follows, there is understood by "arylene" a radical a polyvalent aromatic nucleus devoid of substituents or bearing, on the other hand, substituent groups such as lower alkyl, lower alkoxyl, halogen or nitro and by "phenylene" a polyvalent benzene nucleus condensed or not with another ring group, bearing or not the above said substituent groups.

When these nuclei occur at the end of a chain, all their valencies but one being filled by a hydrogen atom or one of the above said substituents, they will be called "aryl" or "phenyl."

The method according to the invention is characterised by the reaction of first compounds comprising two functional groups selected from among the following, which will be called "complementary" to one another:

(a)

in which is a phenylene group (or phenyl when this group is at the end of a chain) with at least one free position ortho to that of the carbon atom of the ring which is linked to the nitrogen atom of the imino-chloride group;

(b) nitrile group —C≡N with second compounds bearing functional groups complementary to those of the first compounds, in the presence of a Lewis acid in a solvent medium, of the type of those used in Friedel and Crafts reactions, enabling operation at a temperature comprised between about 60° C. and about 180° C.

This method applies the possibility of addition of the nitrile functions of the first or second compounds considered above on the imino-chloride functions of the second or first compounds, these additions being then followed by ring formation generating the quinazoline rings.

Such a type of reaction, applied to the manufacture of simple quinazolines, has already been described by MEERWEIN et al., Chem. Berichte 89, No. 2, p. 224 1956). However hitherto it has never been applied under conditions enabling the production of polyquinazolines.

In a first embodiment of this method, the first compound bears two imino-chloride functions of the type specified at the second two nitrile functions.

In this first embodiment, the first elementary reaction, which is then repeated, each time with a concomitant elongation of the chain, may be illustrated by the following equation, for example when the LEWIS acid is aluminum chloride:

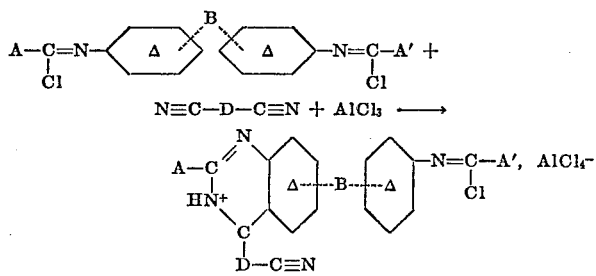

it being understood that in this reaction A, A', B and D are the groups to which the imino-chloride functions and the nitrile functions of the compounds considered are attached.

Preferably, the first compound has either the following formula:

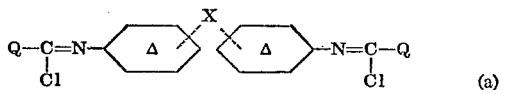 (a)

in which Q is an aliphatic or aromatic group, X is a direct linkage, a short chain or —CH$_2$—, —CO—, —O—, —SO$_2$— or —S—, group and

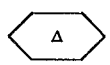

has the above-indicated meaning (the two M radicals of the above said formula being capable of being identical or different), or the formula

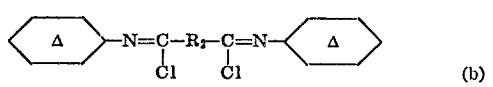 (b)

in which

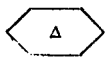

has the above-indicated meaning, and R$_2$ is a direct linkage or an arylene group, the second compound being in all cases a dinitrile of the formula:

in which R$_4$ is a direct linkage or an arylene, alkylene or aralkylene group. In the first case, the product of the reaction is then a polyquinazoline which can be characterised by the following formula:

(I) 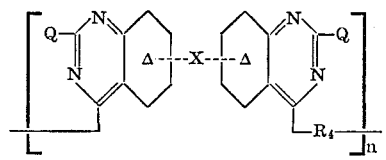

in which

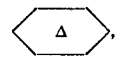,

X, R$_4$ and Q have the above-indicated meanings and $n$ is the number of repeating units of the polymer.

In the second case, the product of reaction obtained is a polyquinazoline of the formula:

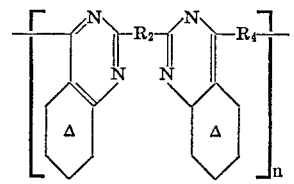 (II)

in which

,

R$_2$ and R$_4$ have the above-indicated meanings.

In a second embodiment of the method according to the invention, the first compound applied in the reaction bears at the same time an imino-chloride function and a nitrile function. It is then the same for the second compound which can also be identical with the first. In this latter case, the reaction becomes a polymerisation by condensation. These compounds have then especially one of the following formulae:

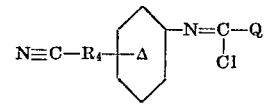 (c)

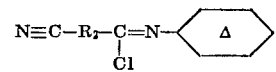 (d)

in which R$_2$, R$_4$, Q and

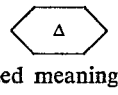

have the above-indicated meanings, nucleus

having in all cases a free position ortho to the carbon atom directly linked to the nitrogen atom of the imino-chloride function.

The polyquinazolines obtained can then be characterized by the following formulae.

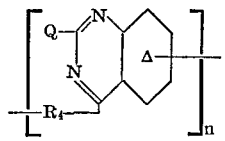 (III)

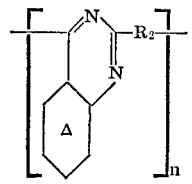 (IV)

in which $R_2$, $R_4$, Q and

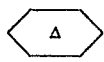

have the above-indicated meanings.

Polyquinazolines according to the invention, can also be obtained by an alternative of the method according to the invention, this alternative being characterised in that there is made to react a polyiminochloride of which the repeating units contain groups

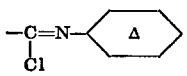

in which

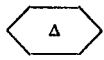

has the above-indicated meaning, with a free position ortho to the linkage with the nitrogen atom with a nitrile of the formula M—C≡N, in which M has also the above-indicated meaning, in the presence of a catalyst of the LEWIS acid type, under the conditions already described, this reaction being capable of being expressed by the general equation.

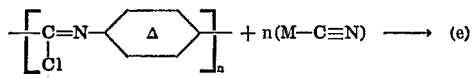

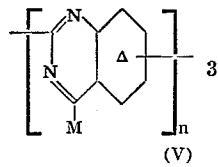

(V)

Polyiminochlorides which lend themselves particularly well to this reaction, have the general formula:

(f)

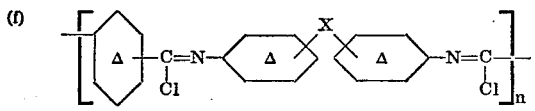

in which the

groups have the above-indicated meanings, those which are linked directly to nitrogen atoms of the imino-chloride groups being however free of substituents at at least one of their ortho positions vis-à-vis these linkages, and X has the above-indicated meaning.

The polymer obtained in the latter case can then be represented by the following general formula:

(VI)

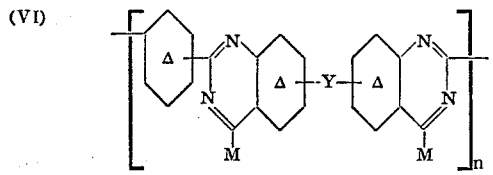

The reactions which have just been described all bring in to play addition reactions of nitriles on imino-chloride functions, followed by cyclisation.

The Lewis acid can be of any type currently used in addition reactions of the Friedel and Crafts type. For example, aluminum chloride, antimony pentachloride, ferric chloride, or stannic chloride, are particularly well suited for these reactions.

With regard to the solvent, recourse can be had to any suitable solvent for reactions of the Friedel and Crafts type, such as nitrobenzene, orthodichlorobenzene, tetrachloroethane, etc. which enable operation in the range of temperature suitable for the reaction, especially between 60° C. and 180° C., advantageously about 120° C.

In all cases, the polyquinazoline obtained can be isolated from the reaction medium and from the Lewis acid and in any suitable manner, especially by precipitation in ether and treatment by a base, or by precipitation in an alcohol if necessary supplemented with a base, or by elimination of the solvent and decomposition of the polyquinazoline catalyst complex by the action of water vapor.

The initial polyiminochlorides can, generally be obtained from the corresponding amides by reaction of the latter, in the absence of solvent or in a volatile inert solvent medium, such as benzene, carbon tetrachloride, advantageously at a temperature comprised between 80° C. and 120° C., with an acid chloride, such as $PCl_5$, $SOCl_2$, etc. the iminochloride being finally obtained after elimination of the solvent, secondary reaction products and the excess of acid chloride, especially by evaporation.

In particular the imino-chlorides $a$, $b$, $c$, $d$, $e$, $f$, may be respectively obtained from the following corresponding amides:

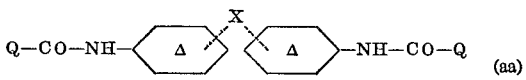

(aa)

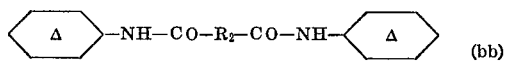

(bb)

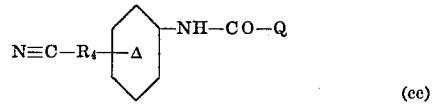

(cc)

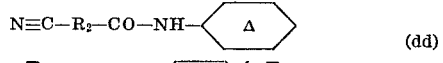

(dd)

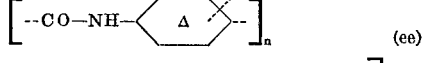

(ee)

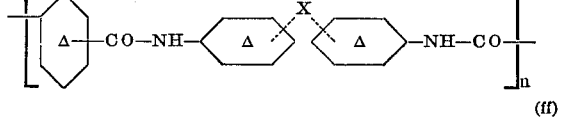

(ff)

In preferred embodiments of the method acording to the invention, recourse will not however be had to previous isolating of the imino-chlorides, especially if the manufacture of the imino-chlorides is already effected in the midst of the solvent in which the Friedel and Crafts reaction will latter be carried out.

Also there can already be added, at the stage of manufacture of the imino-chloride from the corresponding amides, the Lewis acid which facilitates the obtaining and the placing in solution of these imino-chlorides, which can, after the addition of the compounds with nitrile functions, lead to the final polyquinazolines.

The conversion of the amide functions into iminochloride functions and the reaction of the compounds bearing these imino-chloride functions with the compounds bearing nitrile functions, can be effected in one and the same step.

The synthesis of the polyquinazoline will be realized by heating a solution in the cyclizing solvent of a mixture containing the amide function bearing compounds, the nitrile function bearing compounds, the acid chloride and the Lewis acid in stoichiometric proportions.

It will be observed, however, that in the case where one starts with a polyamide, the polymeric structure of the polyquinazoline is induced by that of the polyiminochloride, that is to say prior to cyclization. An excess of mononitrile can be used, this compound then playing both the role of reactant and the role of reaction solvent.

The products prepared by the method according to the invention have, after drying, the form of powders of which the color varies mostly from yellow to brown. According to the nature of the reactants used and the variations in the reaction brought into play, the said powders are completely infusible, or have softening points at temperatures comprised between 250° C. and 300° C. These powders are partially or totally soluble, as the case may be, in concentrated sulfuric acid, but certain of them are also similarly soluble in chloroform, nitrobenzene, dimethylformamide and formic acid and solvents of the amide type, such as N-methyl pyrrolidone.

Examinations effected by infrared spectrometry, by isopiestic distillation, etc. show the presence of quinazoline groups and reveal molecular weights at least equal to 2,000 and even more, especially when the starting product is already constituted by a polyamide. When the powders obtained are soluble, the viscosity can be measured and filmogenic properties can be shown, characteristic of high molecular weights.

As will be seen in the examples given below, thermogravimetric analysis shows that the products according to the invention have a very good stability in an oxidizing atmosphere as well as in an inert atmosphere.

Example 1

Condensation of N,N'-dibenzoylbenzidine with terephthalodinitrile.

3.9 g. (0.01 mole) of N,N'-dibenzoylbenzidine and 4.4 g. (0.021 mole) of phosphorus pentachloride in 40 cm.$^3$ of nitrobenzene are stirred under an inert atmosphere at 120° C. Complete solubility is rapidly obtained (about ¼ hour). At the end of 1 hour's heating, there is added 1.3 g. (0.01 mole) of terephthalodinitrile which is dissolved in the yellow orange reaction mixture, followed by 2.9 g. of powdered aluminum chloride. The addition of the latter at 120° C. causes a rapid coloration of the solution to a brown black, deepening in the course of prolonged heating for three hours, the final temperature reaching 200° C.

The solution obtained, cooled, is freed by filtration of a minimal quantity of an insoluble product. Starting from the filtrate, about 6 g. of yellow brown powder are precipitated by ether. After drying, treatment by stirring with 20% aqueous soda for two hours, acid washing and drying under vacuum at 100° C., there are obtained 3.4 g. of brown powder, infusible at 360° C., but soluble in the cold in nitrobenzene, chloroform, as well as in concentrated sulfuric acid.

Example 2

Condensation of dibenzoyl benzidine with isophthalodinitrile.

Procedure is exactly as in Example 1, replacing the terephthalodinitrile with isophthalodinitrile and respecting the molar proportions.

The medium after reaction does not contain insoluble products. After precipitation with ether, there is obtained 6.3 g. of clear maroon powder, which, after treatment with soda, washing and drying under vacuum (0.01 mm. Hg) at 130° C., give 4.6 g. of orange yellow powder, soluble in chloroform and softening towards 330° C. Its molecular weight, measured by isopiestic distillation, is 2000.

Example 3

Condensation of isophthalodianilide with isophthalodinitrile.

3.15 g. of isophthalodianilide (0.01 mole) and 4.4 g. of PCl$_5$ (0.021 mole) in 25 cm.$^3$ of nitrobenzene are stirred at 120° C. under an inert atmosphere for 1 hour (total solubility). Then there is added 1.3 g. (0.01 mole) of isophthalodinitrile and 2.65 g. of powdered aluminum chloride. At 120° C., the solution becomes immediately very dark brown. After heating for one hour at 120° C., 1 hour at 140° C., 1 hour at 160° C., 1 hour at 180° C., 1 hour at 200° C., the cool solution does not contain insoluble products. By precipitation with ether, there is obtained 5.8 g. of brown powder, which are reduced to 4.1 g. after treatment with soda.

The product obtained softens from 300° C., is soluble in concentrated sulfuric acid and formic acid, and is only partially soluble in chloroform, nitrobenzene, dimethylformamide, dimethyl acetamide, and in N-methylpyrrolidone. Its ash content indicates again a content of aluminum of 1.25%.

Finally, there is given in the table below, expressing the relative losses by weight as percentages, the results of its thermogravimetric analysis effected in nitrogen and in air (rate of rise of temperature: 5° C./minute), which are characteristics of the thermal behavior of all the polyquinazolines prepared according to the present invention.

| Atmosphere | Temperature, ° C. | | | | | | |
|---|---|---|---|---|---|---|---|
| | 400 | 500 | 600 | 700 | 800 | 900 | 1,000 |
| N$_2$, percent | 0 | 2 | 7 | 17.5 | 21 | 22.5 | 23 |
| Air, percent | 1 | 2 | 5 | 16 | 21.5 | 25.5 | 32 |

In the three examples below, relative to the same case, the operational conditions, the reaction products other than the diamide and the dinitrile as well as the molecular proportions are the same as in Example 3.

Example 4

Condensation of isophthalodianilide with the terephthalodinitrile.

Operation is as in Example 3 replacing isophthalodinitrile by terephthalodinitrile, in the same molecular proportions. The final product is a mauve gray powder insoluble in all solvents, except sulfuric acid.

Example 5

Condensation of terephthalodianilide with isophthalodinitrile.

Operation is under the same conditions as in Example 3, with the reactants taken in the same molecular proportions. The final product is a yellowish brown powder softening towards 350° C. and completely soluble only in sulfuric acid and formic acid.

Example 6

Condensation of terephthalodianilide with the terephthalodinitrile.

The same conditions are applied as in Example 3, with the reactants taken in the same molar proportions. The final product is a yellowish brown powder infusible towards 360° C. and completely soluble in sulfuric acid only.

Example 7

Condensation of parabenzoylaminobenzonitrile.

This product, at once a nitrile and an amide, is prepared by the action of cuprous cyanide on the N-benzoyl derivative of parabromaniline.

2.2 g. (0.01 mole) of nitrile-amide and 2.4 g. (0.011 mole) of PCl$_5$ are stirred into 25 cm.$^3$ of orthodichlorobenzene during 30 minutes to 120° C. To the yellow solution obtained is added 1.4 g. of aluminum chloride, which dissolves therein. After 1 hour at 140° C., a deposit is formed on the walls. The heating is pursued for two hours, whilst the temperature is gradually raised to 170° C. After treatment with ether, then with soda, a previously, 2.6 g. of clear brown powder are obtained, which softens around 360° C., but is insoluble in all the solvents.

Example 8

The polyamide used to start is a poly (biphenylisophthalamide) prepared from benzidine and isophthaloyl chloride and the mononitrile is benzonitrile.

1.6 g. of finely divided polyamide and 2.15 g. of PCl$_5$ in 40 cm.$^3$ of nitrobenzene are stirred at 120–140° C. for two hours.

At 120° C., there is added 1 g. of benzonitrile (1/100 mole) and 1.35 g. of AlCl$_3$. The addition of aluminum chloride causes immediate solubility. Heating is for one hour at 150° C., 45 minutes at 175° C. and finally 45 minutes at 200° C.

After cooling, the solution solidifies to a black brown gel, which is treated with ether, but the powder obtained is itself treated with soda as in the previous examples. There is finally obtained 2.2 g. of product infusible at 360° C., and insoluble in all solvents.

The table below relates to results of thermogravimetric analysis, in nitrogen and in air and for different temperatures, of the polyquinazoline thus obtained and of the polyamide. It gives the values of the loss in weight of the two products as a percentage of the initial weight.

| Atmosphere | Temperature, °C. | | | | | | | |
|---|---|---|---|---|---|---|---|---|
| | 300 | 400 | 500 | 600 | 700 | 800 | 900 | 1,000 |
| Nitrogen: | | | | | | | | |
| Polyquinazoline | 0 | 0.5 | 1.5 | 5.5 | 19.5 | 23 | 26.5 | 27.5 |
| Polyamide | 0 | 0.5 | 2 | 30 | 41.5 | 44.5 | 46 | 46.5 |
| Air: | | | | | | | | |
| Polyquinazoline | 0.5 | 0.5 | 2.5 | 9 | 16 | 25 | 31 | 38.5 |
| Polyamide | 0.5 | 1 | 4 | 19 | 27.5 | 34 | 39.5 | 47.5 |

It is noticed that the thermostability of the polyquinazoline is better than that of the polyamide both in nitrogen and in air.

Example 9

The cyclisation solvent of the FRIEDEL and CRAFTS type is replaced by an excess of monitrile.

The polyamide is a poly (diphenyletherisophthalamide) prepared from 4,4'-diphenylether diamino and from isophthaloyl chloride.

1.6 g. of finely divided polyamide and 2.5 g. of phosphorus pentachloride in 25 cm.³ of benzonitrile are stirred for 15 minutes at 110° C. To the greenish yellow suspension obtained are added at this temperature and in a single lot 1.7 g. of aluminum chloride. The reaction medium immediately is converted into a gel or orange red color, which little by little liquifies and becomes a rather viscous solution. The reaction is prolonged for a half hour at 10-120° C. After coloing, the product is precipitated in methanol; the yellow powder obtained is treated several times with methanol, then with ether, then dried at 100° C. under vacuum. There is finally obtained 1.8 g. of beige white powder, dark brown in the mass, with softening point around 300° C. This compound is soluble in tetrachlorethane, nitrobenzene, N-methyl pyrrolidone, pyridine. Its inherent viscosity $\rho_{inh.}=0.3-0.4$ dl./g. (determined at 30° C. for 0.5% solutions in N-methylpyrrolidone). Films have been producable from solutions in the latter solvent.

Elementary analysis of this product gives the following results:

C=81.06%, N=11.0%, H=3.61%

The calculated elementary composition being:

C=81.6%, N≡11.2%, M=4.0% for the repeating unit:

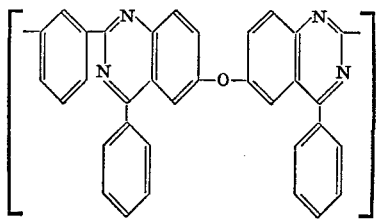

As in the preceding example, the thermogravimetric analysis establishes the distinct improvement in the thermostability in nitrogen and in air of the polyquinazoline with respect to the polyamide.

Example 10

Preparation of the polyquinazoline derived from poly (diphenylether-isophthalamide) modified by acetonitrile.

1.6 g. of polyamide and 2.5 g. of phosphorus pentachloride in 50 cm.³ nitrobenzene are stirred for 15 minutes at 120° C. To the solution obtained, is added 1.75 g. of stannic chloride. The color changes to deep brown. There is immediately added 5 cm.³ of acetonitrile. The reaction is pursued for 30 minutes. The temperature of the reaction mixture then reaches 125° C. After precipitation in methanol, washing with soda and drying, there are obtained 1.9 g. of a fibrous greenish yellow product softening towards 275° C.

Elementary analysis gives the following result:

C=74.86%, N=14.10%, H=4.32% the calculated elementary composition for the repeating unit:

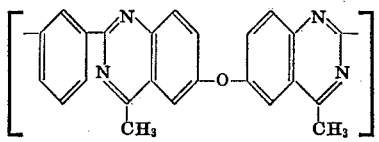

being

C—76.6%, N=14.89%, H=4.26%

The inherent viscosity $\rho_{inh.}$ is 0.41 dl./g. (concentration=0.5% in N-methylpyrrolidone).

Example 11

Polyquinazoline derived from poly (diphenylmethane-isophthalamide) and from benzonitrile.

1.6 g. of polyamide and 2.3 g. of PCl₅ in 30 cm.³ of nitrobenzene are stirred at 120° C. The complete solution is obtained at the end of 35 minutes. 5 cm.³ of benzonitrile then 1.5 g. of aluminum chloride are added and the reaction is allowed to continue for 30 minutes at 120° C. From the brown solution obtained, there is isolated by precipitation in methanol 2.2 g. of yellow powder soluble in nitrobenzene, N-methylpyrrolidone and sulfuric acid, infusible at 360° C.

Inherent viscosity=0.323 dl./g. (0.5% in N-methylpyrrolidone).

Elementary analysis: C=85.10%, N=10.33, H=4.33%. Calculated composition: C=84.3%, N=11.23%, H=4.42%.

Example 12

Polyquinazoline derived from poly (diphenylsulfoneisophthalamide) and from benzonitrile.

The same operational conditions are used as in Example 11. Starting from 1.9 g. of polyamide, 1.95 g. of fibrous brown product are obtained, soluble in nitrobenzene, N-methylpyrrolidone and sulfuric acid, and melting towards 270° C.

Example 13

Polyquinazoline derived from poly (diphenylether-terphthalamide) and from benzonitrile.

1.6 g. of polyamide and 2.3 g. of PCl₅ are stirred into 25 cm.³ of nitrobenzene at 120° C. The polyiminochloride, in this case, remains unsoluble in the form of an intense yellow powder. At the end of 15 minutes there are added 5 ml. of nitrobenzene then 1.5 g. of aluminum chloride. After heating to 120° C. for 30 minutes, there is obtained a very viscous brown solution from which are isolated 2.2 g. of a yellow fibrous powder by precipitation in methanol. The product is soluble in concentrated sulfuric acid as well as in N-methylpyrrolidone and hot nitrobenzene. It softens towards 380° C.

Inherent viscosity=0.57 dl./g. (0.5% in N-methyl pyrrolidone).

Elementary Analysis: C=81.50%, N=10.66%, H=4.03%.

Example 14

Polyquinazoline derived from poly(diphenylterephthalimide) and from benzonitrile.

Operations are under the same conditions as in the Example 13. The product isolated is only soluble in concentrated sulfuric acid and softens towards 360° C.

Example 15

Polyquinazoline derived from poly (diphenylmethaneterephthalamide) and from benzonitrile.

The same operating conditions are used as in Example 13. The product, soluble only in concentrated sulfuric acid, softens above 360° C.

Example 16

Polyquinazoline derived from poly(diphenylsultoneterephthalamide) and from benzonitrile.

The same operational conditions are used as in Example 13. The product, soluble only in concentrated sulfuric acid, softens towards 360° C.

It is noted in the preceding examples, that the intermediate polyiminochlorides are not isolated. They can however be isolated, as is shown in Example 17 which follows where the two steps (1) formation of the polyiminochloride from the polyamide and (2) conversion of the polyiminochloride, have been separated.

Example 17

The initial products are the same as those of Example 9.

1st step: Manufacture of the polyiminochloride 1.6 g. of poly(diphenyletherisophthalamide) and 2.2 g. of phosphorus pentachloride in 25 cm.³ of nitrobenzene are stirred at 120° C. complete solubility is obtained at the end of 15 minutes. The rather viscous yellow solution, cooled to about 60° C. (below this temperature there is a cloudiness produced and then precipitation), is poured into anhydrous ether. The fibrous pale yellow precipitate is dried at 80° C. under vacuum.

The elemental composition of this product is as follows:

$$C=64.90\%, N=7.48\%, H=3.01\%$$

the calculated elemental composition for the repeating unit:

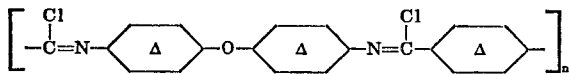

being $$C=65.40\%, N=7.64\%, H=3.28\%$$

2nd step: Transformation of polyiminochloride into polyquinazoline 0.6 g. of this polyiminochloride are stirred into 25 cm.³ benzonitrile with 0.55 g. of aluminum chloride to 130° C. At the end of an hour, the brown solution obtained is precipitated after cooling by methanol. After washing and drying, there is obtained a 5.55 g. of clear yellow powder whose properties are essentially the same as those of the product of Example 9.

It results from the preceding Examples, that the polymers according to the invention have a remarkable thermal stability which is doubtless attributable to their system of conjugated double bonds.

The method according to the invention applied to aromatic polyamides is especially of interest in that it enables two successive conversions of these polyamides. It is known that the latter can be obtained very easily from inexpensive starting materials. These polyamides are very difficultly handable. They decompose mostly before melting, are of slight solubility, so they can only if necessary be shaped with much difficulty.

It will thus be appreciated that the method according to the invention enables the conversion of the polyamides into particularly interesting products, which obviate to a great extent the defects of the polyamides, in that these polyquinazolines do not decompose before fusion, so that they can be easily moulded.

Generally, and whatever the variant or alternative of the method according to the invention used, the polyquinazolines according to the invention find numerous applications, especially in the electrical and aeronautical industries, for example as binders for composite materials, varnishes, adhesives, hot-drawn moulded parts, coatings and protective films resistant to temperature and to radiations.

It is to be borne in mind in the claims which follow, that by "arylene radical" is meant a polyvalent aromatic nucleus devoid of substituents or bearing, on the contrary, substituent groups such as lower alkyl, lower alkoxyl, halogen or nitro.

In the case where "phenylene" is specified, it should be taken to be understood as a radical with a polyvalent benzaneic nucleus devoid of substituents.

The same observations apply to the expressions "aryl" and "phenyl."

I claim:

1. Film forming polyquinazolines essentially formed of chains of quinazoline nuclei of the formula

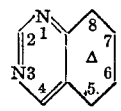

in which

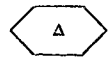

is a

nucleus, where R is hydrogen or represents one or several lower alkyle, lower alkoxyle or halogen substituents at one or several of the free positions on the ring, these quinazoline nuclei being linked between them either at their 2-positions through a direct linkage or an arylene group and at their 4-positions through a direct linkage or an arylene, alkylene or alkylarylene group;

or at their 2-positions through an arylene group and at one of their 5-, 6-, 7- and 8-positions through a direct linkage or a —CH₂—, —CO—, —O—, —SO₂— or —S— group; the quinazoline nuclei of the polyquinazolines thus obtained bearing an alkyl or homocyclic aryle radical M, at their 4-positions;

or at their 4-positions through a direct linkage or through an arylene, alkylene or aralkylene group and at one of their 5-, 6-, 7-, 8-positions, directly or through a —CH₂—, —CO—, —O—, —SO₂— or —S— group; the quinazoline nuclei of the polyquinazolines then obtained bearing an homocyclic aryle radical Q at their 2-positions.

2. Film forming polyquinazolines according to claim 1, whose recurring units essentially have the following formula:

(I)

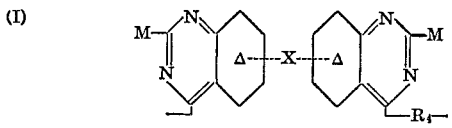

in which M has the above-indicated meaning, X is a —CH₂—, —CO—, —O—, SO₂— or —S— group and R₄ is a direct linkage or an arylene, alkylene or aralkylene group.

3. Film-forming polyquinozolines according to claim 2 wherein X represents a direct linkage and the Q group is a phenyl group.

4. Film forming polyquinazolines according to claim 1, whose recurring units essentially have the following formula:

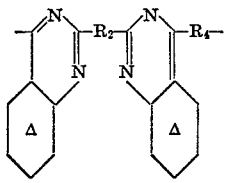

(II)

in which $R_2$ is a direct linkage or an arylene group and $R_4$ is a direct linkage or an arylene, alkylene or aralkylene group.

5. Film forming polyquinazolines according to claim 4, wherein the groups $R_2$ and $R_4$ are phenylene nuclei.

6. Film forming polyquinazolines according to claim 1, whose recurring units essentially have the following formula:

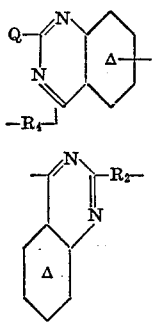

(III)

(IV)

in which $R_2$ is a direct linkage or an arylene group, $R_4$ is a direct linkage or an arylene, alkylene or aralkylene group and Q is an homocyclic aryl radical.

7. Film forming polyquinazolines according to claim 6 characterised by the formula III in which Q is a phenyl group and $R_4$ is a direct linkage.

8. Film forming polyquinazolines according to claim 1, wherein the quinazoline nuclei consist essentially of groups:

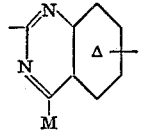

(V)

in which M is an alkyle or homocyclic aryleradical.

9. Film forming polyquinazolines according to claim 8, whose recurring units essentially have the following formula:

(IV)

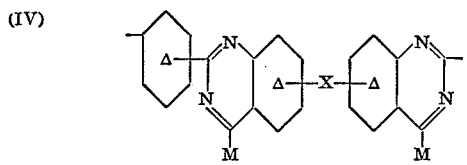

in which M has the meaning indicated above and X is a direct linkage or a —O—, —CH$_2$—, —SO$_2$—, —CO— or —S— group.

10. Film forming polyquinazolines according to claim 9, wherein M is a phenyl or methyl group.

11. Method of manufacturing film forming polyquinazolines which comprises reacting a diiminochloride derivative of the type

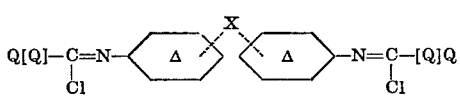

(a)

in which X is a direct linkage or a —CH$_2$—, —CO—, —O—, —SO$_2$— or —S— group;

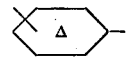

is an arylene group and [Q] Q is an homocyclic aryl group;
or of the type

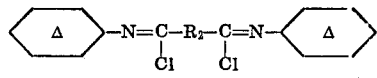

(b)

in which

has the same meaning and $R_2$ is a direct linkage or an arylene group;

with a dinitrile of the type N≡C—$R_4$—C≡N in which $R_4$ is an arylene, alkylene or aralkylene group;

in the presence of a Lewis acid in a solvent medium, of the type used in Friedel and Crafts reactions, and at a temperature between about 60° C. and about 180° C.

12. Method according to claim 11, wherein

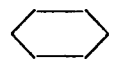

$R_2$ and $R_4$ are phenylene nuclei and Q is a phenyl nucleus.

13. Method of manufacturing polyquinazolines which comprises either homopolymerizing of the compounds having the following formula:

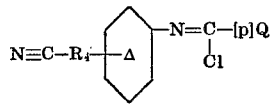

(c)

or

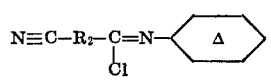

(d)

in which

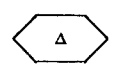

is an arylene or aryl group as the case may be, having a free position ortho to the linkage with the nitrogen atom, $R_2$ is a direct linkage or an arylene group, $R_4$ represents a direct linkage or arylene, alkylene or aralkylene groups and —Q— an aryl or lower alkyl group, or copolymerizing both compounds in the presence of a Lewis acid in a solvent medium, of the type used in Friedel and Crafts reactions, and at a temperature between about 60° C. and about 180° C.

14. Method according to claim 13, wherein the

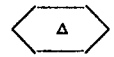

$R_2$ and $R_4$ groups are phenylene nuclei and M is a phenyl nucleus.

15. Method according to claim 13, wherein the Lewis acid is constituted by a salt selected from the group consisting of aluminum chloride, antimony pentachloride, ferric chloride and stannic chloride.

16. Method of manufacturing film forming polyquinazolines which comprises reacting a polyiminochloride defined by the basic unit:

(f)

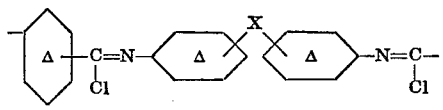

in which the

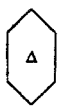

groups have the above-indicated meaning, those which are linked directly to nitrogen atoms of the imino-chloride groups, being however free of substituents in at least one of their ortho positions vis-à-vis these linkages, and X is a direct linkage or a —CH$_2$—, —CO—, —O—, —SO$_2$— or —S— group, in the presence of a Lewis acid in a solvent medium of the type used in Friedel and Crafts reactions between about 60° C. and about 180° C.

17. Method which comprises reacting with an acid chloride consisting of PCl$_5$ or SOCl$_2$, a compound with amide functions having one of the following formulae:

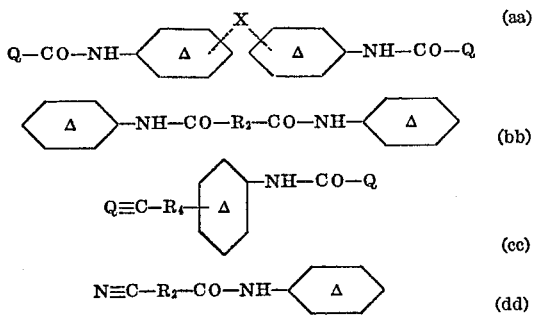

or a polyamid formed of recurring units having the following formula

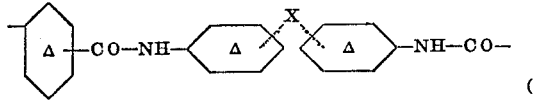

in which R$_2$ is a direct linkage or an arylene group; R$_4$ is a direct linkage or an arylene, alkylene or an aralkylene group;

is an arylene or aryl group as the case may be; X is a direct linkage or a —CH$_2$—, —CO—, —O—, —SO$_2$— or —S— group; M is an aryl or lower alkyl group.

18. Method according to claim 17, wherein said previous conversion is effected at a temperature between about 80° C. and 120° C.

19. Method according to claim 17 wherein the initial diamide is N,N'-dibenzoyl-benzidine, isophthaldianilide or terephthaldianilide and the dinitrile used is isophthaldinitrile or terephthaldinitrile.

20. Method according to claim 17 wherein the initial compound is para-benzoylamino-benzonitrile.

21. Method according to claim 17 wherein the initial polyamide is one of the following polyamides:
poly (diphenyl-isophthalamide);
poly (diphenylether-isophthalamide);
poly (diphenylmethane-isophthalamide);
poly (diphenylsulfone-isophthalamide);
poly (diphenylether-terephthalamide);
poly (diphenylsulfone-terephthalamide);
poly (diphenyl-teraphthalamide);
poly (diphenylmethane-terephthalamide);
and the compound with a nitrile function is constituted by benzonitrile or acetonitrile.

22. Method according to claim 16 wherein the Lewis acid is constituted by a salt selected from a group consisting of aluminum chloride, antimony pentachloride and stannic chloride.

23. Method according to claim 17, wherein the

group in any of said compounds with amide functions has a free position ortho to the linkage with the corresponding nitrogen atom and wherein the reaction with said acid chloride is followed by a reaction of transformation of the compound with iminochloride function obtained into a polyquinazoline in the same solvent medium, without intermediate separation of the imino-chloride function compound.

References Cited
UNITED STATES PATENTS 3,475,374  10/1969  Marvel et al. _____ 260—47
3,484,387  12/1969  Jackson et al. _____ 260—2
3,563,917  2/1971   Marvel _____ 260—2

LESTER L. LEE, Primary Examiner

U.S. Cl. X.R.

260—30.2, 30.8 R, 31.2 N, 32.4, 32.6 N, 33.6 R, 33.8 R, 47 CP, 61 63 N, 78.4 N